May 23, 1967 E. JÄGGLE 3,320,838
TURRET LATHE
Filed Sept. 24, 1964
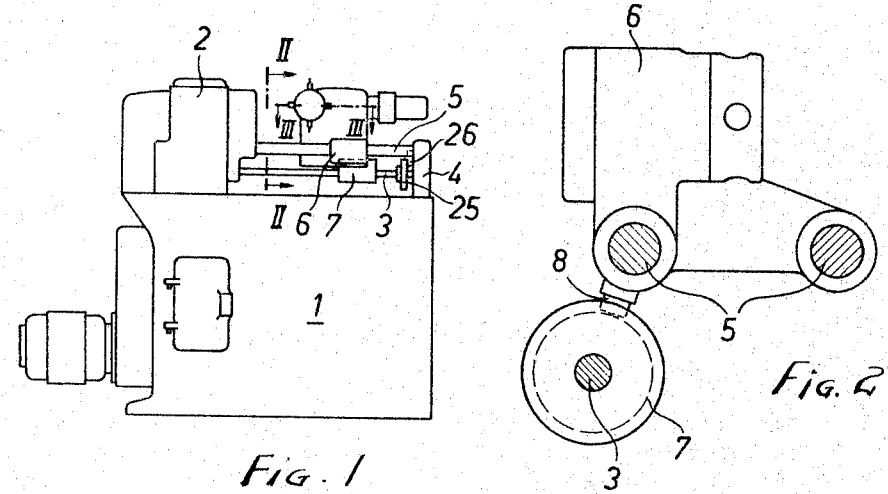
Fig. 1
Fig. 2
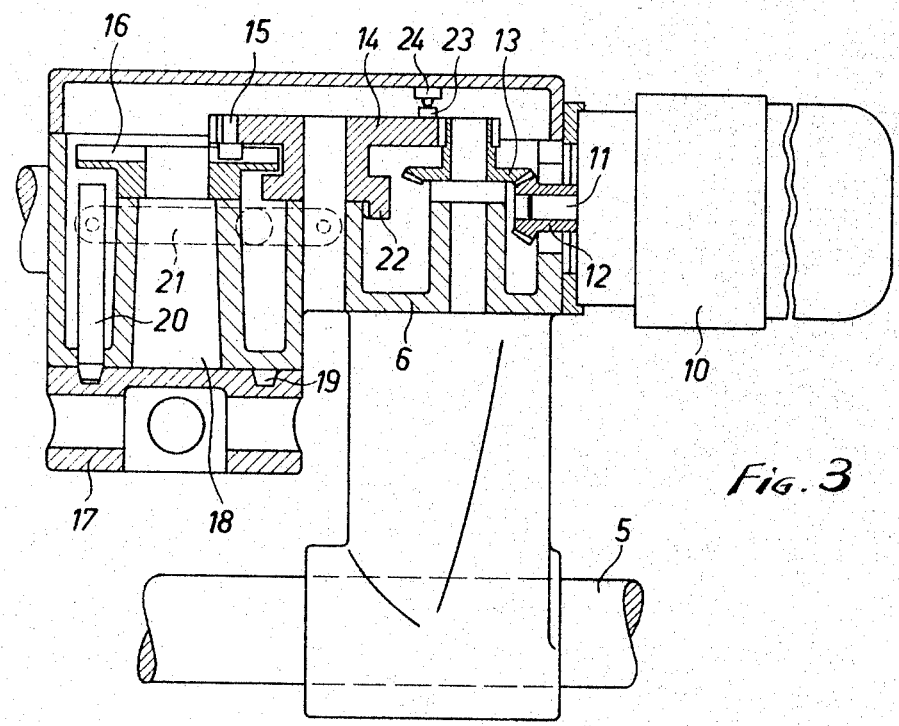
Fig. 3
INVENTOR:
ERICH JÄGGLE
by Jacob L. Kollin
ATTORNEY 3,320,838
TURRET LATHE
Erich Jäggle, Hochdorf uber Plochingen, Germany, assignor to Firma Hermann Traub, Reichenbach (Fils), Germany
Filed Sept. 24, 1964, Ser. No. 399,009
Claims priority, application Germany, Feb. 25, 1964, T 17,214
1 Claim. (Cl. 82—21)

The present invention relates to a turret lathe or similar machine tool, and more particularly improvements in an automatic one-spindle or chuck lathe which is provided with a star turret which is movable by means of a control shaft in the axial direction of said shaft.

It is an object of the present invention to provide a lathe turret and more particularly a star turret of a more simple and inexpensive construction than that of previous lathe turrets.

For attaining this object, the invention provides that the turret is slidably mounted on a pair of guide rods extending parallel to the lathe bed so as to be movable thereon in the longitudinal direction by means of a sliding element which is maintained in positive engagement with the turret. For turning the tool support of the turret from one operating position to another, the invention provides a motor, preferably an electric motor, which is mounted on the turret housing and is provided with a brake mechanism for stopping the rotation of the drive shaft of the motor as soon as the latter is switched off when the tool support has been moved to its next operating position. Since the turret itself is of a very simple construction and since it is slidably mounted on a pair of simple guide rods, it is possible to manufacture it at a much lower cost than that of similar turrets according to prior designs. The present invention may be applied not only to a star turret but also to a drum turret.

Another feature of the invention consists in the provision of two separate switches for starting and stopping the motor which turns the tool support of the turret from one operating position to the other. One of these switches is operatively associated with the control shaft for the turret, while the other switch is associated with a wheel which is driven by the motor. This switch arrangement insures that the motor will always be switched on and off very accurately when desired, even though the control shaft is rotated at a very low speed.

The features and advantages of the present invention will become more clearly apparent from the following detailed description thereof which is to be read with reference to the accompanying drawings, in which—

FIGURE 1 shows a front view of an automatic one-spindle lathe which is equipped with a turret according to the invention;

FIGURE 2 shows an enlarged cross section which is taken along the line II—II of FIGURE 1; while FIGURE 3 shows another enlarged cross section which is taken along the line III—III of FIGURE 1.

In the drawings, the invention is illustrated in the form of an automatic one-spindle lathe which is provided with a start turret and comprises a lathe bed 1 on which a headstock 2 is mounted which contains a spindle through which a rod-shaped workpiece may be fed to its cutting position. The headstock 2 further contains suitable means such as gears for driving a control shaft 3 which is rotatably mounted at one end in the headstock 2 and at the other end in a support 4 which is likewise mounted on the lathe bed 1. A pair of smooth guide rods 5 which are laterally spaced from each other and extend parallel to the control shaft 3 are rigidly mounted at their opposite ends on the headstock 2 and on the support 4 and carry a turret housing 6 which is slidable in the axial direction on these guide rods 5. For sliding the turret housing 6 along the guide rods 5, a rotary cam member 7 is secured to the control shaft 3. This cam member 7 is provided with a cam groove into which a roller 8 engages which is mounted on the turret housing 6. Thus, the turret housing 6 is positively moved in the axial direction of guide rods 5 by the rotary movement of the cam member 7 on the control shaft 3. The means for moving the turret housing 6 along guide rods 5 may, however, also consist of a suitable motor which may be driven electrically, hydraulically, or pneumatically.

The turret housing 6 carries an electric motor 10 or a motor which is driven hydraulically or pneumatically. This motor 10 is provided with a brake mechanism, not shown, for stopping the drive shaft 11 of this motor as soon as the latter is switched off. By means of bevel gears 12 and 13, the drive shaft 11 is adapted to rotate a wheel 14 which is mounted in the housing 6 and provided with a driving pin 15 which is adapted to engage successively into one or another of the slot-shaped recesses of a Maltese-cross wheel 16 which is likewise enclosed in the housing 6 and mounted on one end of a shaft 18 which carries a star-shaped tool support 17 on its other end.

For locking this tool support 17 in each of its operating positions, it is provided with a certain number of locking recesses 19 in accordance with the number of tools which are to be mounted thereon. An index or locking pin 20 which may be raised and lowered by a two-armed lever 14 is adapted to engage alternately into one or another of the locking recesses 19 when lever 24 is pivoted by a cam projection 22 on the driving wheel 14. This driving wheel 14 is further provided with a cam projection 23 which is adapted to engage once at each revolution of wheel 14 with a switch 24 on the wall of housing 6 for interrupting the supply of current to the electric motor 10 when the tool support 17 is arrested by the locking pin 20 in one of its operating positions. For moving the tool support 17 to its next operating position, motor 10 is started by means of a control wheel 25 which is mounted on the control shaft 3 and, when the latter is rotated, acts upon a switch 26 on the support 4 to connect the motor 10 to its current supply.

The operation of the machine as above described is as follows:

During each revolution of the control shaft 3, the turret is moved by the cam member 7 toward the workpiece, a machining operation is thereby carried out by one of the tools which is mounted on the tool support 17, and the turret is thereafter moved back to its original position. As soon as this occurs, the control wheel 25 actuates the switch 26 to start the electric motor 10 which then turns the tool support 17 by means of the Maltese-cross transmission 15, 16 to its next operating position after the locking pin 20 has been lifted and disengaged from the respective locking recess 19 in the tool support 17. As soon as the next tool in the tool support 17 arrives in its operating position, the tool support is again locked by the locking pin 20 and the cam projection 23 acts at the same time upon the switch 14 to cut off the current to the motor 10 and to stop its rotation immediately by means of the brake mechanism. A further rotation of the control shaft 3 will then move the new tool so as to carry out the next machining operation.

Although my invention has been illustrated and described with reference to the preferred embodiment thereof, I wish to have it understood that it is in no way limited to the details of such embodiment, but is capable of numerous modifications within the scope of the appended claim.

Having thus fully disclosed my invention, what I claim is:

A lathe comprising in combination a bed, a pair of parallel guide rods laterally spaced from each other secured to and extending above and longitudinally along said bed, a turret slidably mounted on said guide rods, means for positively sliding said turret along said guide rods, said turret comprising a housing, a tool support for a plurality of tools rotatably mounted on said housing, a motor mounted on said housing and having a drive shaft for turning said tool support from one operating position to another, switch means for starting and stopping said motor, periodically, brake means for quickly stopping the rotation of said drive shaft when said switch means are actuated to stop said motor, said switch means comprising two separate switches for starting and stopping said motor, said sliding means comprising a control shaft and means for driving said shaft, a driving wheel adapted to be driven by said motor for turning said tool support, means on said control shaft for actuating one of said switches, means on said driving wheel for actuating the other switch, transmitting means connecting said motor shaft with said tool support, said transmitting means comprising a Maltese-cross transmission within said housing including a driving wheel having a driving pin eccentrically thereon, and bevel gears connecting said motor shaft to said driving wheel for driving the same, said means on said control shaft adapted to actuate said starting switch and said means on said driving wheel adapted to actuate said stopping switch, means for locking said tool support in each of its operating positions comprising a locking bolt adapted alternately to engage into one of a plurality of locking recesses in said tool support corresponding to the number of tool-mounting positions thereon, and a lever for reciprocating said locking bolt so as to engage into and disengage from said locking recesses, and means on said driving wheel for pivoting said lever.

References Cited by the Examiner
UNITED STATES PATENTS

| | | | |
|---|---|---|---|
| 250,514 | 12/1881 | Flower | 29—46 |
| 2,027,568 | 1/1936 | Whipp et al. | 82—21 X |
| 2,936,656 | 5/1960 | Conover | 74—822 X |
| 3,116,537 | 1/1964 | Boner | 29—44 |

WILLIAM W. DYER, JR., *Primary Examiner.*

LEONIDAS VLACHOS, *Examiner.*